United States Patent [19]
Brolund et al.

[11] Patent Number: 5,266,775
[45] Date of Patent: Nov. 30, 1993

[54] CUTTER FOR REMOVING DROSS PRODUCED BY A PLASMA ARC TORCH

[75] Inventors: Theodore F. Brolund; Matthew J. Walling, both of Rockford, Ill.

[73] Assignee: W. A. Whitney Co., Rockford, Ill.

[21] Appl. No.: 961,413

[22] Filed: Oct. 15, 1992

[51] Int. Cl.⁵ .................. B23K 10/00; B23K 9/013
[52] U.S. Cl. .................. 219/121.39; 219/121.38; 219/121.48; 407/14; 407/30
[58] Field of Search .............. 219/121.65, 121.35, 219/121.38, 121.48, 75; 51/419, 71, 54; 407/14, 30, 64

[56] References Cited
U.S. PATENT DOCUMENTS 3,474,219  10/1969  Steigerwald et al. ......... 219/121.69
5,091,625  2/1992  Kohda et al. ................. 219/121.44

Primary Examiner—Mark H. Paschall
Attorney, Agent, or Firm—Leydig, Voit & Mayer

[57] ABSTRACT

Molten metal created during cutting of a workpiece by a plasma-arc torch is discharged downwardly into a tubular collector duct. A power-rotated cutter is located adjacent the upper end of the duct and shaves dross from the underside of the workpiece as the latter is moved beneath the torch, the dross also being discharged downwardly into the duct. Water is sprayed into the duct to cool the duct and is also sprayed against the rotary cutter to cool the cutter as the dross is shaved from the workpiece.

16 Claims, 4 Drawing Sheets

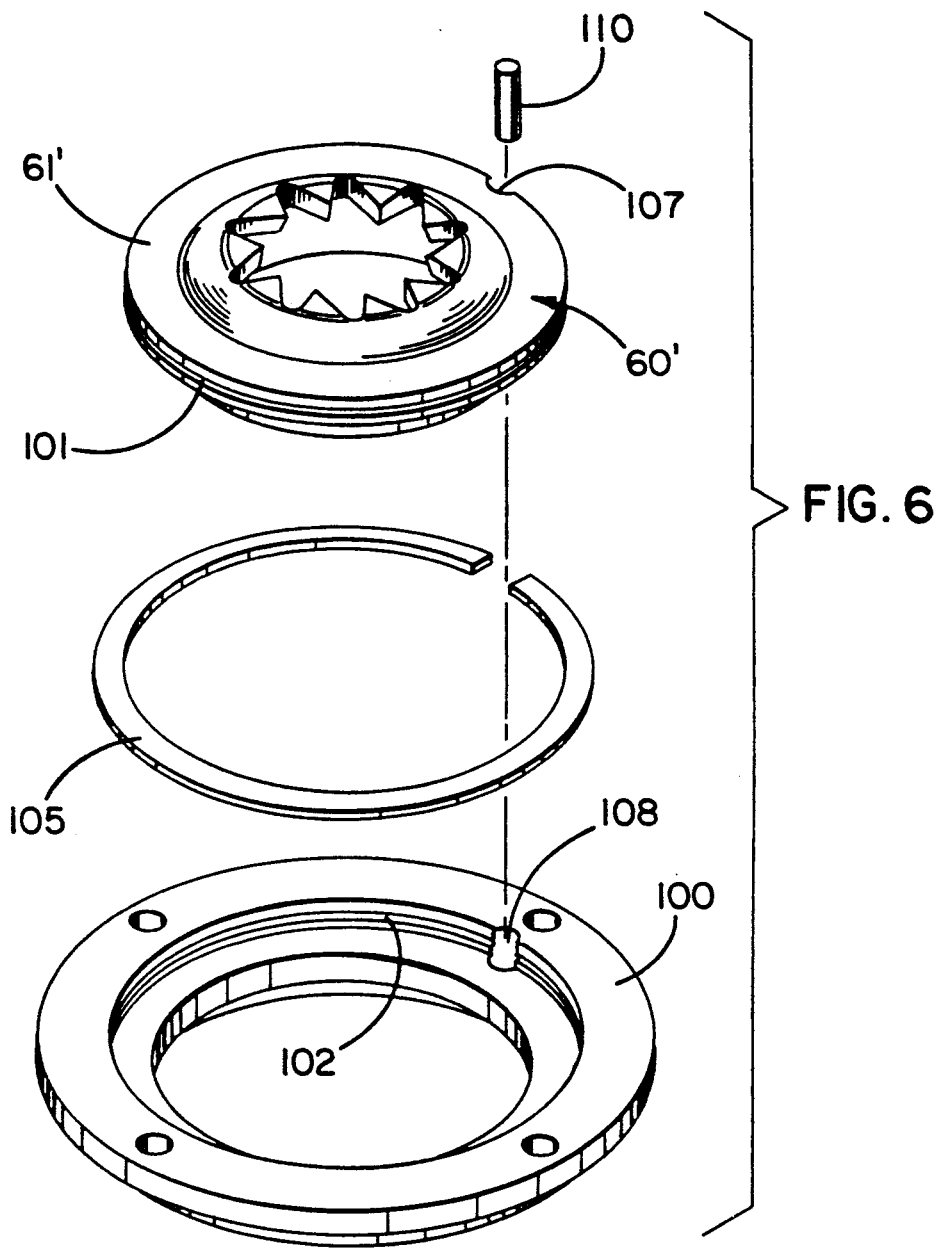

CUTTER FOR REMOVING DROSS PRODUCED BY A PLASMA ARC TORCH

BACKGROUND OF THE INVENTION

This invention relates to apparatus for cutting a metal workpiece by melting the workpiece with a melting tool such as a plasma-arc torch. Such a torch operates by ionizing a column of gas with an electric arc to produce temperatures up to 30,000 degrees F. A high velocity, high temperature plasma stream strikes the workpiece with the heat serving to melt the metal while the high velocity stream blows away the molten metal.

Apparatus which utilizes a plasma-arc torch to cut a workpiece is disclosed in Scott U.S. Pat. No. 4,338,507. In the apparatus disclosed in that patent, a collector duct is disposed beneath the workpiece in alignment with the torch. Molten metal from the workpiece falls downwardly into the duct. Liquid is sprayed into the upper end of the duct to cool the duct and to flush slag therefrom.

Cutting of the workpiece by the torch is effected as the workpiece is shifted horizontally beneath the torch. As the hot plasma stream melts through the workpiece, dross accumulates on the lower side of the workpiece adjacent the newly formed cuts. When the dross cools and hardens, it creates undesirable ridges on the underside of the workpiece. In many cases it is necessary to grind off the dross after the cutting operation has been completed.

SUMMARY OF THE INVENTION

The general aim of the present invention is to provide new and improved cutting apparatus in which the dross formed by the high temperature cutting operation is removed from the underside of the workpiece while the workpiece is still in the cutting apparatus and as an incident to horizontal movement of the workpiece beneath the melting tool.

A more detailed object of the invention is to achieve the foregoing by means of a rotary cutter located beneath the workpiece and operable to shave dross from the workpiece as the latter is moved beneath the melting tool.

Still another object of the invention is to locate the rotary cutter adjacent the upper end of the collector duct so that dross shaved from the workpiece falls into the duct along with the molten metal.

The invention further resides in cooling the rotary cutter with the same liquid supply which is used to cool the duct.

A further object of the invention is to provide a uniquely mounted cutter which may be quickly removed and replaced.

These and other objects and advantages of the invention will become more apparent from the following detailed description when taken in conjunction with the accompanying drawings.

BRIEF DESCRIPTION OF THE DRAWINGS

FIG. 6. is an exploded perspective view of the modified cutter of FIG. 5.

FIG. 6 is an exploded perspective view of the modified cutter of FIG. 5.

DETAILED DESCRIPTION OF THE PREFERRED EMBODIMENTS

Figure 1:
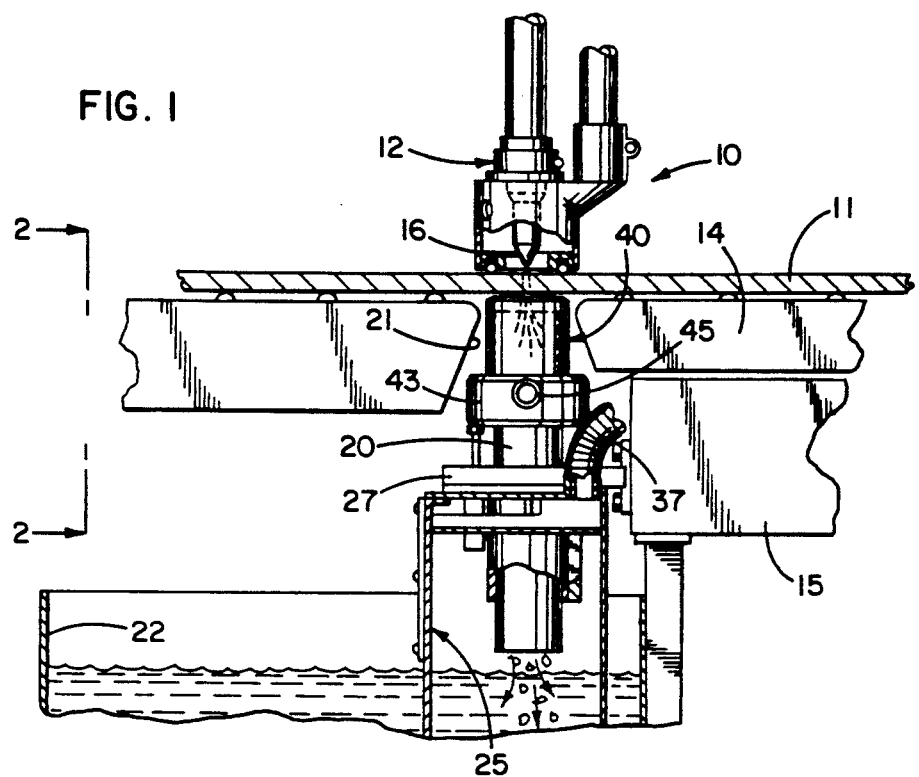
FIG. 1 is a fragmentary front elevational view of new and improved apparatus incorporating the unique features of the present invention, parts of the apparatus being broken away and shown in section.

The present invention is shown in the drawings in connection with apparatus 10 for cutting holes and irregular shaped slots in a sheet metal workpiece 11 through the use of a metal melting tool 12 operable to emit downwardly directed energy for melting the workpiece. The workpiece is disposed in a horizontal plane and is supported on a table 14 which, in turn, is supported on an underlying bed or bolster 15. The table is adapted to be moved along one coordinate or axis in order to shift the workpiece horizontally beneath the tool and position the workpiece for cutting of the holes and slots. In addition, the workpiece is adapted to be shifted on the table and along a perpendicular coordinate or axis by movable work clamps (not shown).

In the present instance, the metal melting tool 12 is a plasma-arc torch, although the tool could be a laser cutter. The plasma-arc torch 12 includes a tip 16 defining a small nozzle through which a hot plasma stream is discharged. The plasma stream is discharged from the nozzle at a high velocity and produces extremely high temperatures to cause instantaneous melting of the underlying portion of the workpiece 11 and to blast molten metal downwardly from the workpiece.

Molten metal is disposed of beneath the table 14. For this purpose, an upright tubular collector duct 20 extends upwardly into a gap 21 in the table, the duct being located in vertical alignment with the tip 16 of the torch 12. The duct is made of metal and is generally cylindrical in shape.

Water or other liquid is supplied continuously to the duct 20 in order to cool the duct and wash slag from the inside of the duct. The lower end of the duct discharges into a relatively large bath of water contained in a tank 22 which is secured to the bolster 15. Slag discharged from the lower end of the duct is carried away to a disposal area by a drag conveyor (not shown) in the bottom of the tank.

Figure 2:
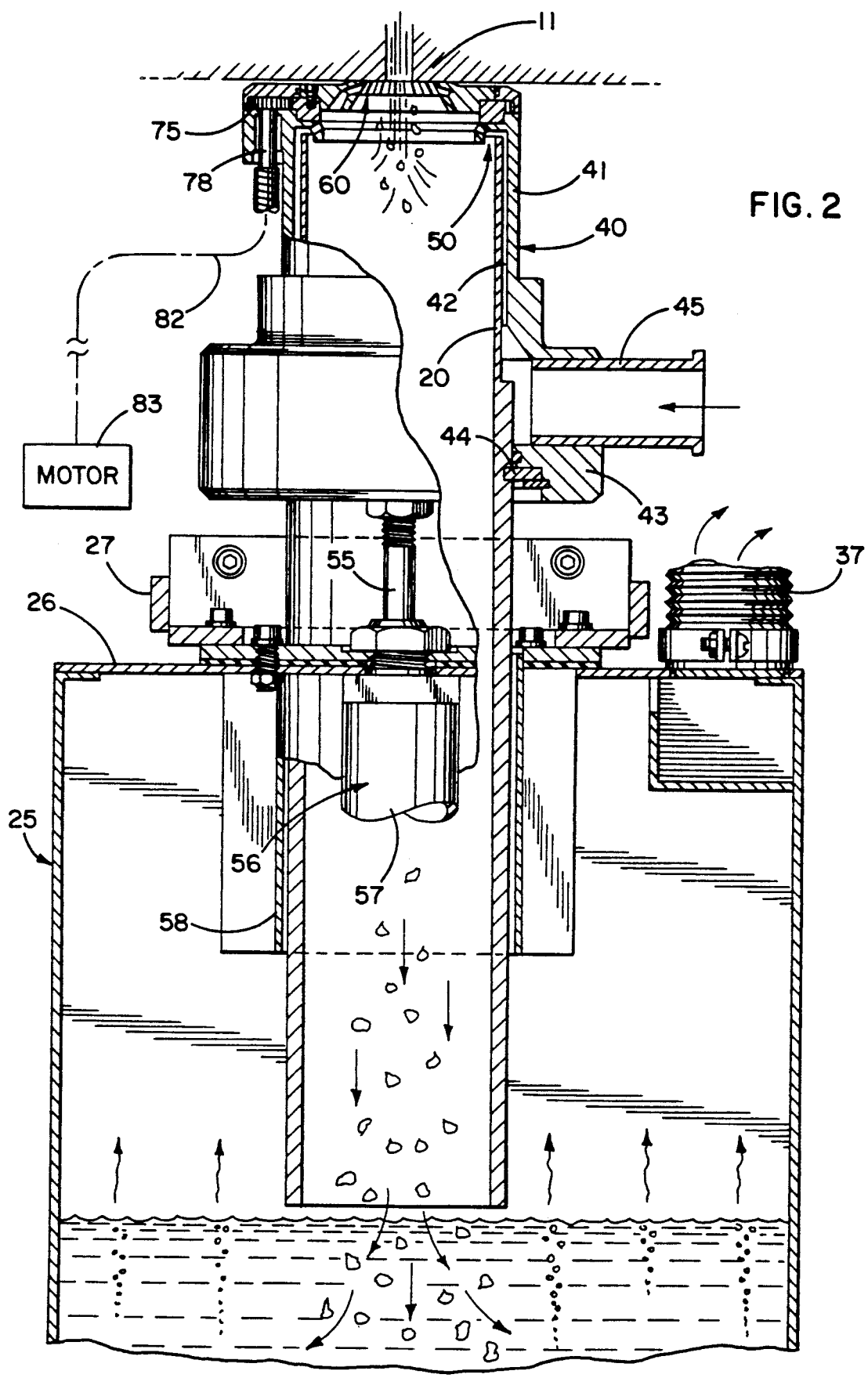
FIG. 2 is an enlarged side elevational view as seen along the line 2—2 of FIG. 1, parts again being broken away and shown in section.

The collector duct 20 is supported by a box-like housing 25 located in the tank 22 and having an open bottom. A top wall 26 (FIG. 2) of the housing is secured to a mounting bracket 27 which, in turn, is fastened to the bolster 15. The duct 20 extends upwardly through the top wall 26 and its upper end is located adjacent the lower side of the workpiece 11. Fumes from the duct flow downwardly into the housing 25 and are sucked out of the housing through a flexible hose 37 which communicates with the housing.

A water jacket 40 (FIG. 2) surrounds the upper end portion of the duct 20. Water is circulated through the jacket to cool the duct and then is directed downwardly inside the duct to further cool the duct and to wash slag out of the duct. To this end, the water jacket includes a cylindrical sleeve 41 which surrounds the upper end portion of the duct. The sleeve is spaced radially outwardly from the outer side of the duct and thus an annular passage 42 is defined between the sleeve and the duct. Formed on the lower end of the sleeve is a collar 43 which is rigidly secured to the duct 20 at 44. A conduit 45 extends into the collar and communicates with the passage 42. The conduit also communicates with a pump (not shown) which draws water out of the tank 22 to a filter and heat exchanger (not shown) for delivery to the passage 42 between the duct 20 and the sleeve 41 of the water jacket 40.

An annular outlet 50 (FIG. 3) is formed at the upper end of the sleeve 41 and the duct 20 to permit water in the passage 42 to be directed into the duct. Herein, the outlet is defined by a wall 51 extending inwardly from the upper end of the sleeve and overhanging the upper end of the duct. Depending from the wall 51 is an annular lip 52 which projects downwardly a short distance into the duct in radially spaced relation from the inner side of the duct. Water is pumped from the tank 22 and is cooled by the heat exchanger. The cooled water then is pumped into the water jacket 40 and circulates through the passage 42 to cool the duct 20. A continuous spray of water is discharged out of the outlet 50 and streams downwardly along the inside of the duct to further cool the duct and to flush slag off of the inside of the duct.

When the torch 12 is not in use, the duct 20 and the water jacket 40 are adapted to be retracted downwardly to an inactive position spaced a short distance below the workpiece 11. For this purpose, the rod 55 (FIG. 2) of a pneumatic actuator 56 is connected to the collar 43 of the water jacket 40 while the cylinder 57 of the actuator is connected to the top wall 26 of the housing 25. When the rod is advanced and retracted, the water jacket 40 is moved upwardly and downwardly, respectively. The duct 20 moves upwardly and downwardly with the water jacket and is guided for up and down sliding by a sleeve 58 which depends from the top wall 26 of the housing 25.

As described thus far, the cutting apparatus 10 is substantially the same as that of Scott U.S. Pat. No. 4,338,507, the disclosure of which is incorporated herein by reference. Kindgren et al U.S. Pat No. 4,523,749 also is incorporated by reference for its disclosure of a table and work clamps for moving a workpiece to different positions along mutually perpendicular coordinates.

As the hot plasma stream from the torch 12 melts the workpiece 11 to form holes and slots therein, dross accumulates on the bottom of the workpiece around the perimeter of each cut. If a workpiece with a smooth underside is required, the hardened dross must be removed from the workpiece. Typically, this is achieved by grinding or machining the underside of the workpiece in a separate operation after the workpiece has been removed from the cutting apparatus 10.

In accordance with the present invention, the dross is immediately removed from the workpiece 11 while the workpiece is still in the cutting apparatus 10 and as an incident to moving the workpiece beneath the torch 12. In this way, removal of the dross is effected immediately upon formation of the dross and without need of performing the secondary operation following removal of the workpiece from the cutting apparatus.

Removal of the dross is achieved through the provision of a cutter 60 (FIGS. 2–4) which shaves the dross from the lower side of the workpiece as the latter is moved horizontally to different positions beneath the torch 12. While the cutter could be a stationary scraper, it preferably is a power-rotated cutting tool of the type shown in FIGS. 3 and 4. Thus, the cutter 60 includes a ring-like body 61 having a central hole 62 extending vertically through the body. Several angularly spaced cutting teeth 63 are formed in the cutter body around the periphery of the hole. The teeth are appropriately raked to cleanly shave away the dross and leave the underside of the workpiece 11 substantially smooth. The hole 62 and the teeth 63 formed therearound are generally frustoconical and flare upon progressing downwardly so as to provide ample clearance for the shaved-away dross to discharge downwardly from the cutter.

Figure 3:
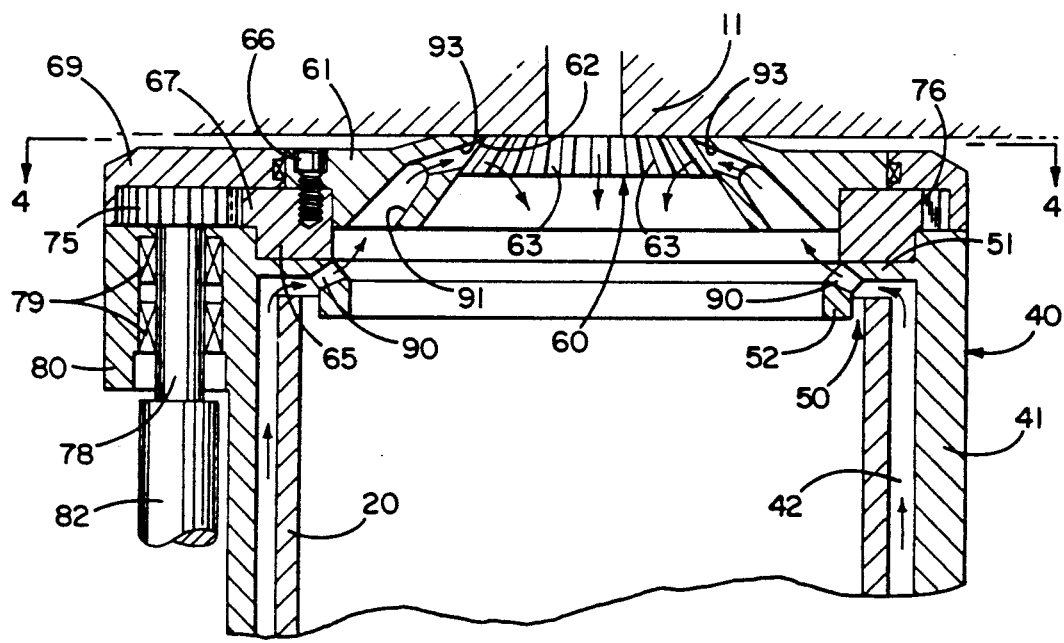
FIG. 3 is an enlarged view of the rotary cutter and the upper end portion of the duct shown in FIG. 2.
Figure 4:
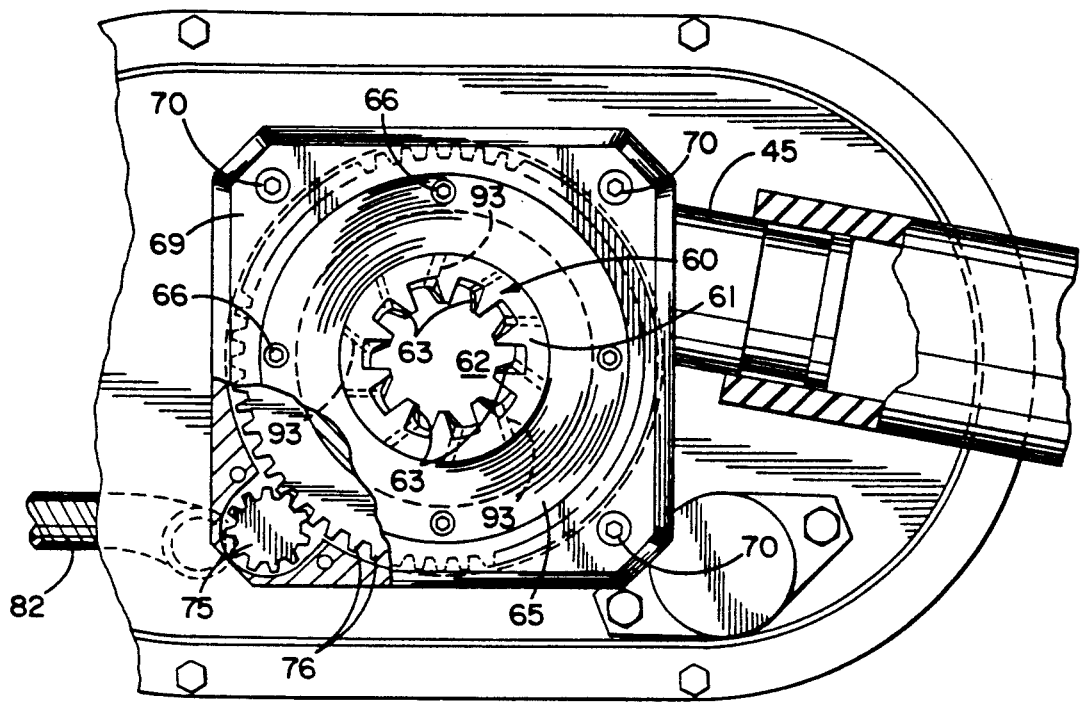
FIG. 4 is a top plan view as seen along the line 4—4 of FIG. 3, certain parts being broken away and shown in section.

Advantageously, the cutter 60 is coaxial with and is located adjacent the upper end of the collector duct 20 so that dross shaved from the workpiece 11 by the cutter is disposed of in the same way as the molten metal removed from the workpiece by the torch 12. As shown in FIGS. 3 and 4, a mounting ring 65 is fastened to the cutter body 61 by screws 66 and seats against the horizontal wall 51 of the water outlet 50. The mounting ring also includes a flange 67 which overhangs the upper end of the sleeve 41 of the water jacket 40. A generally rectangular cover plate 69 overlies the ring and is secured to the water jacket by screws 70 (FIG. 4).

The mounting ring 65 and the body 61 of the cutter 60 are supported to rotate about a vertical axis coinciding with the central axis of the duct 20 by the cover plate 69, the wall 51 and the upper end of the jacket 40. Rotation of the cutter is effected by means of a pinion 75 (FIGS. 3 and 4) which meshes with gear teeth 76 formed on the outer periphery of the flange 67 of the mounting ring 65. The pinion is carried on the upper end of a vertical shaft 78 which is journaled for rotation by bearings 79 located within a bearing block 80 fixed to one side of the water jacket 40. A flexible shaft 82 connects the shaft 78 to a drive motor 83 (FIG. 2) which may be fixed in a stationary position at any suitable location away from heat and water.

Thus, the motor 83 acts through the flexible shaft 82 to rotate the shaft 78 and the pinion 75. The pinion meshes with the gear teeth 76 to rotate the cutter 60 and cause the latter to shave dross from the workpiece 11 for discharge into the duct 20. The flexible shaft accommodates movement of the duct between its raised and lowered positions while allowing the motor 83 to be fixedly secured at a position remote from the duct.

Advantage is taken of the water pumped into the water jacket 40 to cool the cutter 60 and dissipate heat created during shaving of the dross by the cutter. As shown most clearly in FIG. 3, angularly spaced and upwardly and inwardly inclined passages 90 are formed through the lip 52 of the outlet 50. Such passages are directed toward a relatively deep annular groove 91 formed in the lower side of the cutter body 61. Additional angularly spaced and generally inwardly inclined passages 93 are formed through the cutter body and establish communication between the groove 91 and the cutter teeth 63. Preferably, one passage 93 is associated with each cutter tooth 63.

Water pumped into the water jacket 40 for spraying out of the outlet 50 and into the duct 20 is also sprayed through the passages 90, into the groove 91, through the passages 93 and against the teeth 63. The water sprayed against the teeth cools the cutter 60 and the underside of the workpiece 11 to promote shaving of the dross and to increase the service life of the cutter.

From the foregoing, it will be apparent that the present invention brings to the art new and improved workpiece cutting apparatus 10 in which a rotary cutter 60 removes dross from the underside of the workpiece 11 for discharge into the same duct 20 which receives the molten metal produced by the action of the torch 12. The cutter is effective to remove the dross regardless of the direction of movement of the workpiece. Moreover, the cutter is cooled by the same source of water used to cool the duct.

Figure 5:
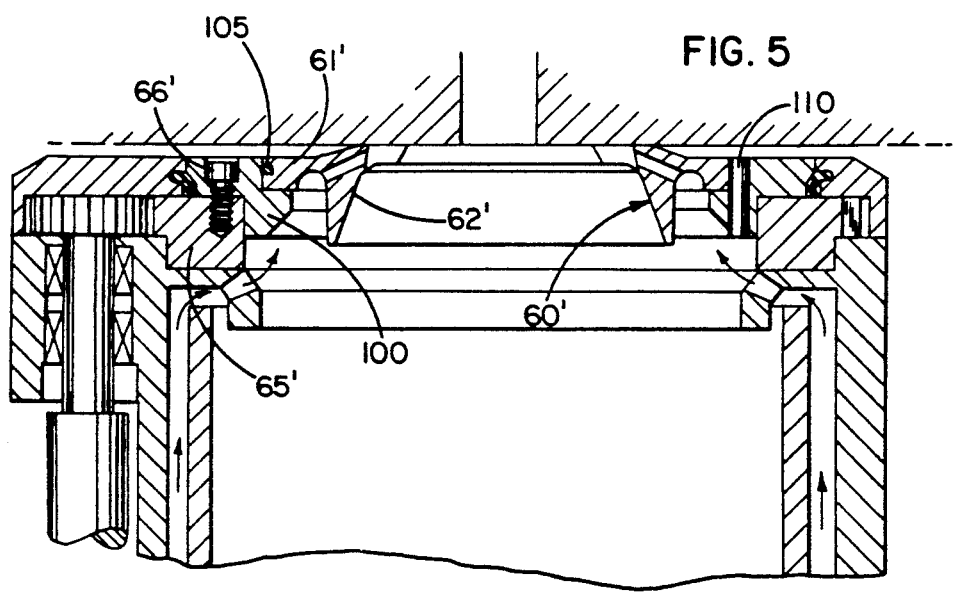
FIG. 5 is a view similar to FIG. 3 but shows a duct with a modified rotary cutter.

A modified embodiment is shown in FIGS. 5 and 6 in which parts corresponding to those of the first embodiment are indicated by the same but primed reference numerals. The modified embodiment is particularly characterized in that the cutter 60', upon becoming worn, may be quickly and easily removed and replaced.

More specifically, an intermediate mounting ring 100 is interposed between the cutter 60' and the toothed ring 65'. Angularly spaced screws 66' are used to secure the intermediate ring 100 to the toothed ring 65'.

The inner periphery of the intermediate ring 100 telescopically receives the outer periphery of the body 61' of the cutter 60'. An annular groove 101 (FIG. 6) is formed circumferentially around the outer periphery of the cutter body 61' while an opposing annular groove 102 is formed circumferentially around the inner periphery of the intermediate ring 100. A resiliently yieldable and radially split retaining ring 105 is received in the groove 101 and is adapted to spring into the groove 102 with a snap fit when the cutter body 61' is telescoped downwardly into the intermediate ring 100. The retaining ring thus releasably holds the cutter body in assembled relation with the intermediate ring. To couple the cutter body 61' for rotation with the ring 100, opposing axially extending notches 107 and 108 (FIG. 6) are formed in the outer periphery of the cutter body 61' and in the inner periphery of the ring 100, the notches being located between the ends of the retaining ring. A drive key or pin 110 fits in the notches and causes the cutter body 61' to rotate with the ring 100.

With the foregoing arrangement, the cutter 60' may be removed simply by placing a screwdriver or other tool in the central hole 62' in the cutter and prying against the cutter body 61' to overcome the force of the retaining ring 105 and release the cutter body from the ring 100. A new cutter may be installed by placing the retaining ring 105 in the groove 101 in the cutter body 61' and by forcing the body downwardly into the ring 100 to cause the retaining ring to snap into the groove 102. Thus, the cutter of the second embodiment may be replaced quickly and easily and without need of removing and reinstalling screws 66 as in the case of the first embodiment.

We claim:

1. Apparatus for cutting a generally horizontal metal workpiece and for removing dross from the underside of the workpiece, said apparatus comprising a metal melting tool located above the workpiece, means for moving the workpiece horizontally to various positions beneath said tool, said tool being operable to emit downwardly directed energy for melting portions of the workpiece so as to form cuts through the workpiece as the latter is moved beneath said tool, an upright tubular duct located below the workpiece and aligned generally vertically with said tool whereby molten metal is directed downwardly into said duct, dross being formed on the underside of said workpiece adjacent said cuts as a result of said portions of said workpiece being melted, and a cutter located in close proximity to the underside of the workpiece and operable to shave dross from the underside of the workpiece as the workpiece is moved horizontally beneath said tool, said cutter being located adjacent the upper end of said duct and being positioned to cause dross shaved from said workpiece to fall into said duct.

2. Apparatus as defined in claim 1 in which said cutter is supported to rotate about a predetermined axis, and power-operated means for rotating said cutter.

3. Apparatus as defined in claim 1 further including means for spraying liquid into said duct and against said cutter in order to cool the duct and the cutter.

4. Apparatus for cutting a generally horizontal metal workpiece and for removing dross from the underside of the workpiece, said apparatus comprising a metal melting tool located above the workpiece, means for moving the workpiece horizontally to various positions beneath said tool, said tool being operable to emit downwardly directed energy for melting portions of the workpiece so as to form cuts through the workpiece, dross being formed on the underside of said workpiece adjacent said cuts as a result of said portions of said workpiece being melted, an upright tubular duct located below the workpiece and aligned generally vertically with said tool whereby molten metal is directed downwardly into said duct, a rotary cutter located adjacent the upper end of said duct in close proximity to the underside of the workpiece, and means for rotating said cutter as said workpiece is moved horizontally beneath said tool whereby said cutter shaves dross from the underside of the workpiece for deposit into said duct.

5. Apparatus as defined in claim 4 further including means for spraying liquid into said duct and against said cutter in order to cool the duct and the cutter.

6. Apparatus as defined in claim 4 in which said cutter comprises a body having a central hole extending vertically therethrough, and angularly spaced cutting teeth formed on said body around the periphery of said hole.

7. Apparatus as defined in claim 6 further including a rotatable mounting ring for said cutter, and means enabling said cutter to be assembled with said ring with a snap fit and releasably holding said cutter and said ring in assembled relation.

8. Apparatus as defined in claim 4 in which said duct and said cutter are supported for vertical movement toward and away from said workpiece, said means for rotating said cutter comprising a motor supported in a fixed position, and a flexible shaft extending between said motor and said cutter to transmit torque from the motor to the cutter while allowing the cutter to move vertically.

9. Apparatus for cutting a generally horizontal metal workpiece and for removing dross from the underside of the workpiece, said apparatus comprising a metal melting tool located above the workpiece, means for moving the workpiece horizontally to various positions beneath said tool, said tool being operable to emit downwardly directed energy for melting portions of the workpiece so as to form cuts through the workpiece, dross being formed on the underside of said workpiece adjacent said cuts as a result of said portions of said workpiece being melted, an upright tubular duct located below the workpiece and aligned generally vertically with said tool whereby molten metal is directed downwardly into said duct, means for directing liquid toward and into the upper end portion of said duct so as to cool the duct and flush molten metal from the duct, a rotary cutter located adjacent the upper end of said duct in close proximity to the underside of said workpiece, means for rotating said cutter as said workpiece is moved horizontally beneath said tool whereby said cutter shaves dross from the underside of the workpiece for deposit into said duct, and means for directing part of said liquid against said cutter so as to cool the cutter during shaving of said dross.

10. Apparatus as defined in claim 9 in which said means for directing liquid into the upper end portion of said duct comprise annular lip means coacting with said duct to define an annular outlet at the upper end portion of the duct, said means for directing liquid against said cutter comprising angularly spaced passages formed through said lip means and positioned to cause liquid to be sprayed against said cutter.

11. Apparatus as defined in claim 10 in which said cutter comprises a body having a central hole formed vertically therethrough, cutting teeth formed on said body and spaced around the periphery of said hole, and angularly spaced passages formed through said body and leading into said hole to cause water from the passages in said lip means to flow to said cutting teeth.

12. Apparatus as defined in claim 11 further including a rotatable mounting ring for said cutter, and means enabling said cutter to be assembled with said ring with a snap fit and releasably holding said cutter and said ring in assembled relation.

13. A rotary cutter for removing dross from the underside of a workpiece, said cutter comprising a body having an outer periphery and having a central hole, cutting teeth formed on said body and spaced around the periphery of said hole, an annular groove formed in and extending circumferentially around the outer periphery of said body, and an axially extending notch formed in the outer periphery of said body.

14. A rotary cutter as defined in claim 13 further including angularly spaced passages formed through said body and leading into said hole for conducting coolant to said teeth.

15. A rotary cutter as defined in claim 13 in combination with a mounting ring for supporting said cutter body, said ring having an inner periphery telescopically receiving the outer periphery of said cutter body, an annular groove in the inner periphery of said mounting ring and disposed in opposing relation with said groove in said cutter body, and a resilient retaining ring received in the groove in said cutter body and snapped into the groove in said mounting ring to releasably hold said cutter body and said mounting ring in assembled relation.

16. A rotary cutter as defined in claim 15 further including an axially extending notch formed in the inner periphery of said mounting ring and aligned angularly with the notch in said cutter body, and key means fitting in said notches and coupling said cutter body and said mounting ring for rotation in unison.

* * * * *